(No Model.)
C. B. WHITAKER.
TYPE WRITING MACHINE.
No. 535,607. Patented Mar. 12, 1895.
Fig. 4
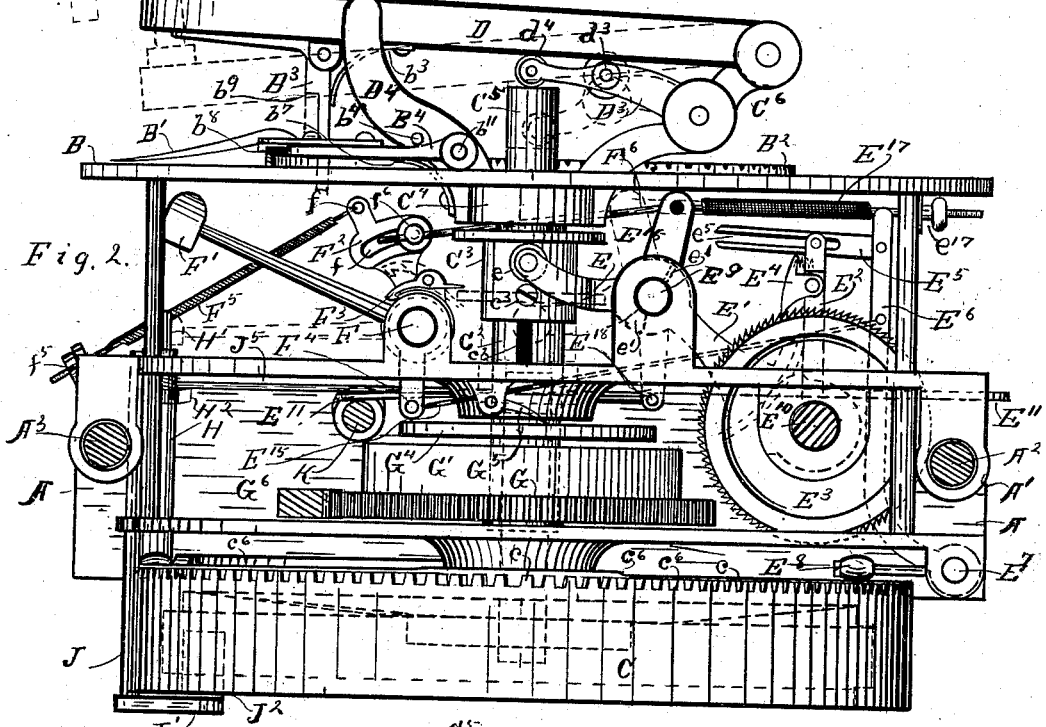
Fig. 2
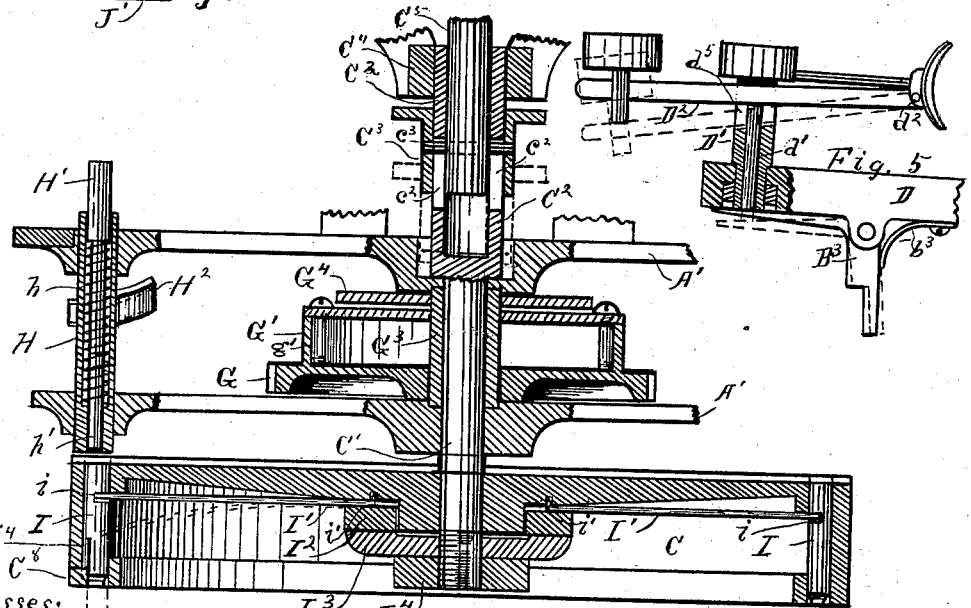
Fig. 5
Fig. 3
Witnesses:
George H. White
F. Allgier.
Inventor
Charles B. Whitaker
By Ithiel J. Cilley
Attorney

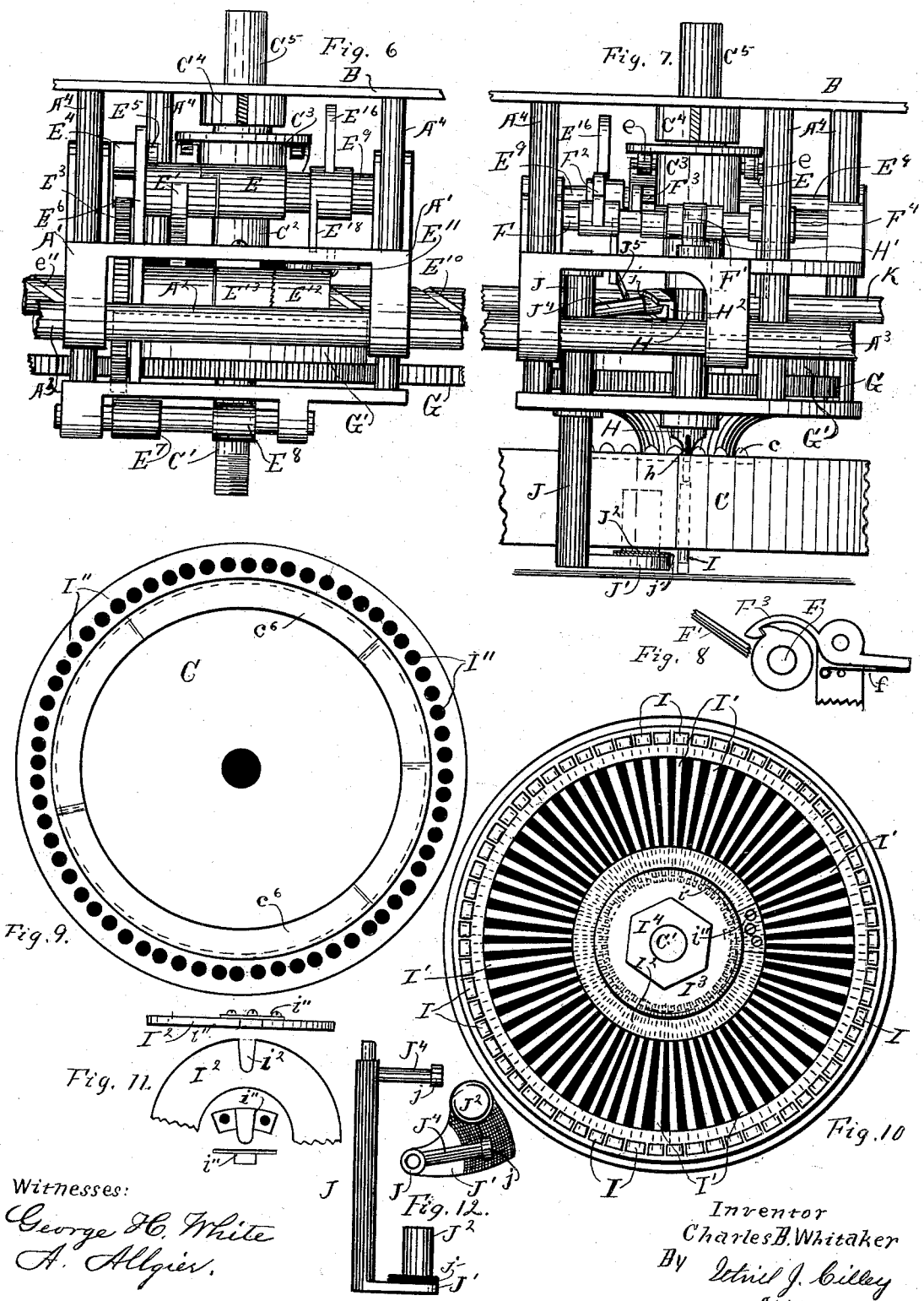

(No Model.) 7 Sheets—Sheet 4.
C. B. WHITAKER.
TYPE WRITING MACHINE.
No. 535,607. Patented Mar. 12, 1895.
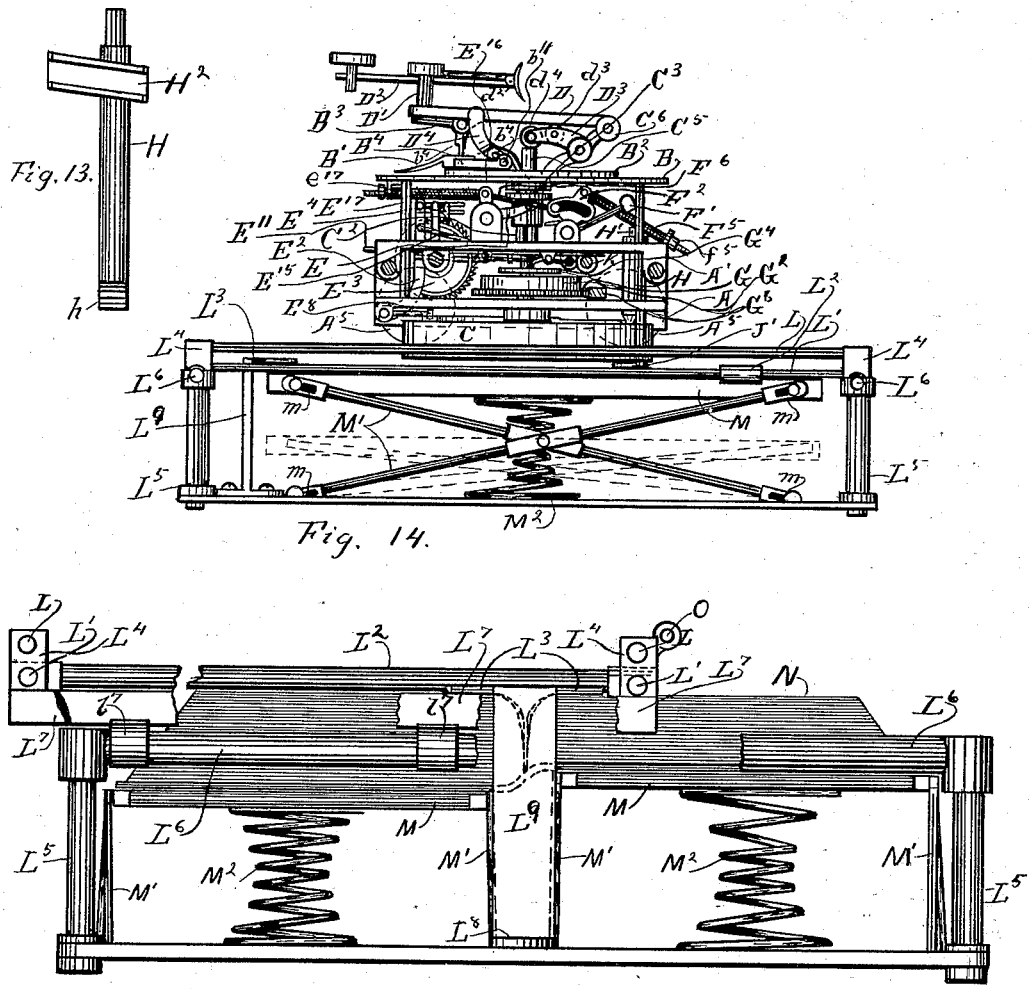
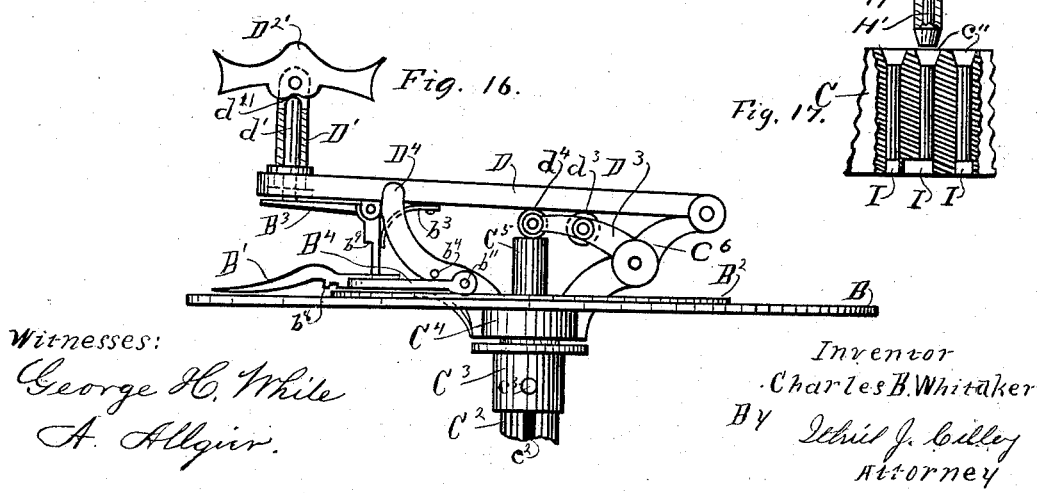
Witnesses:
George H. White
A. Allgur.
Inventor
Charles B. Whitaker
By Ithiel J. Cilley
Attorney

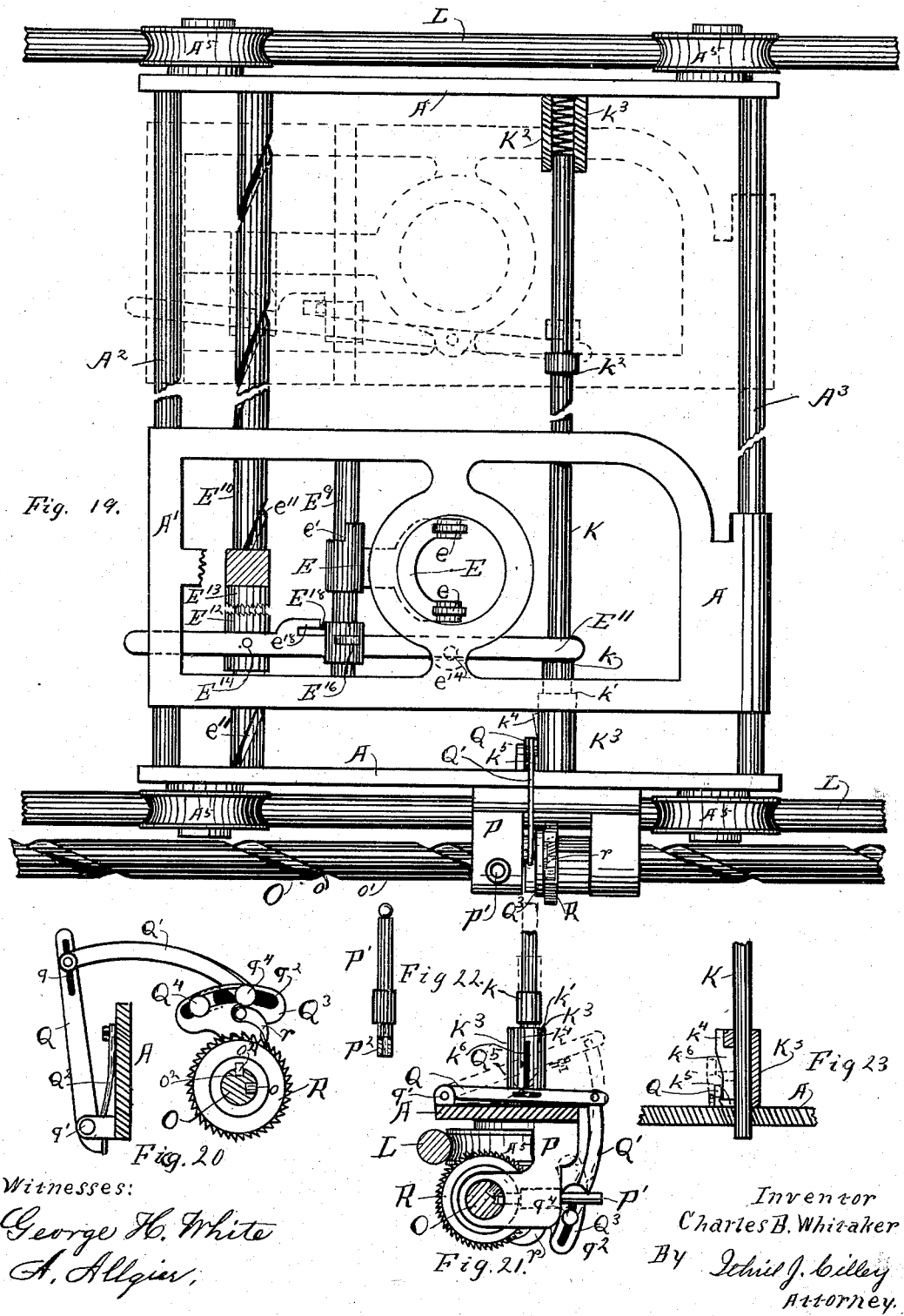

(No Model.)

C. B. WHITAKER.
TYPE WRITING MACHINE.

No. 535,607. Patented Mar. 12, 1895.

7 Sheets—Sheet 7.

Witnesses:
George H. White
A. Allgier.

Inventor
Charles B. Whitaker
By Ichiel J. Cilley
Attorney

UNITED STATES PATENT OFFICE.

CHARLES B. WHITAKER, OF CALEDONIA, MICHIGAN.

TYPE-WRITING MACHINE.

SPECIFICATION forming part of Letters Patent No. 535,607, dated March 12, 1895.

Application filed March 7, 1894. Serial No. 502,763. (No model.)

*To all whom it may concern:*

Be it known that I, CHARLES B. WHITAKER, a citizen of the United States, residing at Caledonia, in the county of Kent and State of Michigan, have invented certain new and useful Improvements in Type-Writers, of which the following is a specification.

My invention relates, particularly, to improvements in type writers for use in printing or writing in books, and its objects are, first, to increase its speed, and at the same time to economize the space occupied by the machine; second, to provide a type writer that may be readily changed from book to sheet writing, and vice versa; third, to provide a type writer that may be readily transferred from one page, across to another, in a book without moving the book, and, fourth, to provide for adjusting the spacing to correspond with the width of the character printed. I attain these results by the mechanism illustrated in the accompanying drawings, in which—

Figure 1:
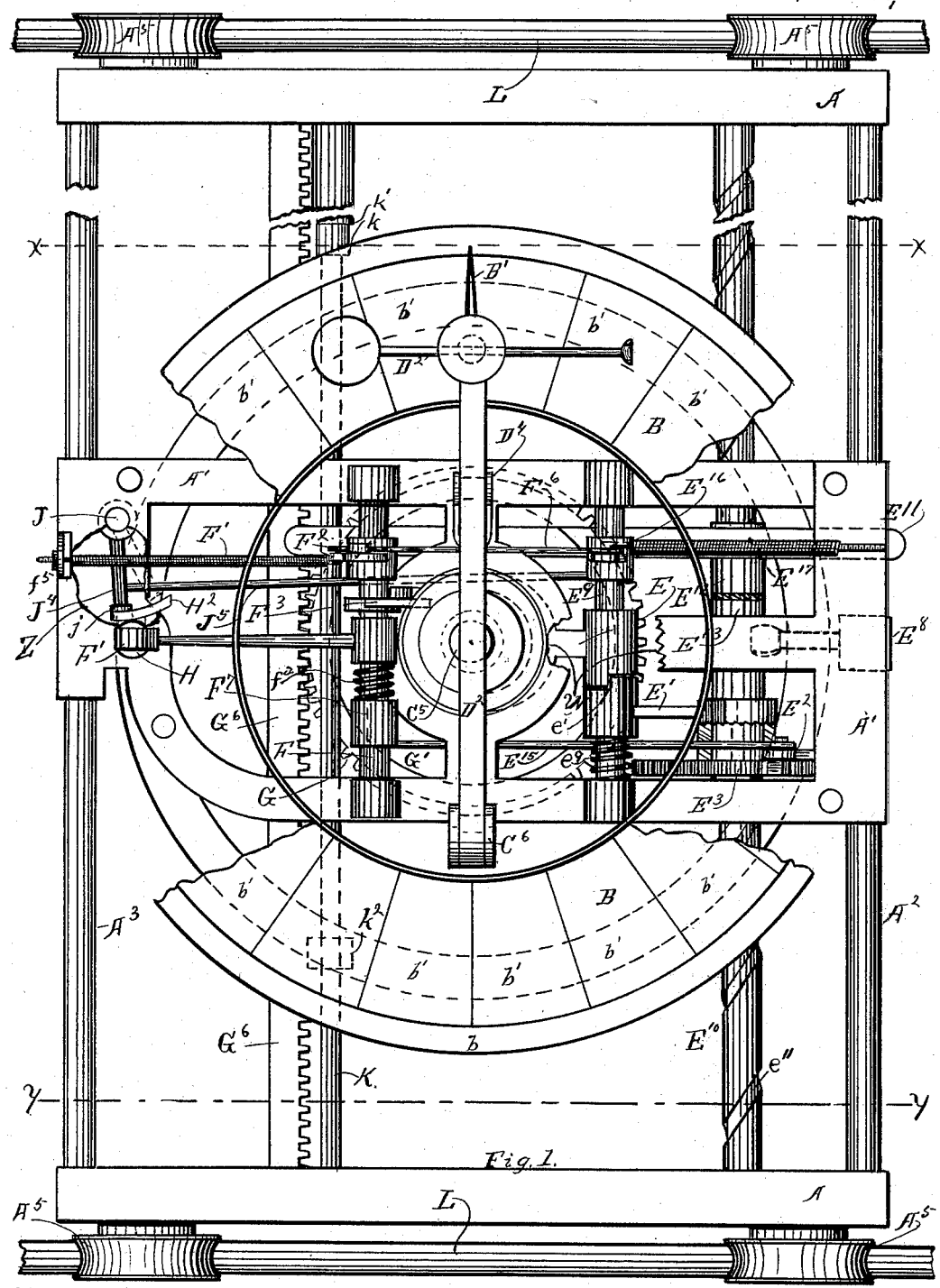
Figure 18:
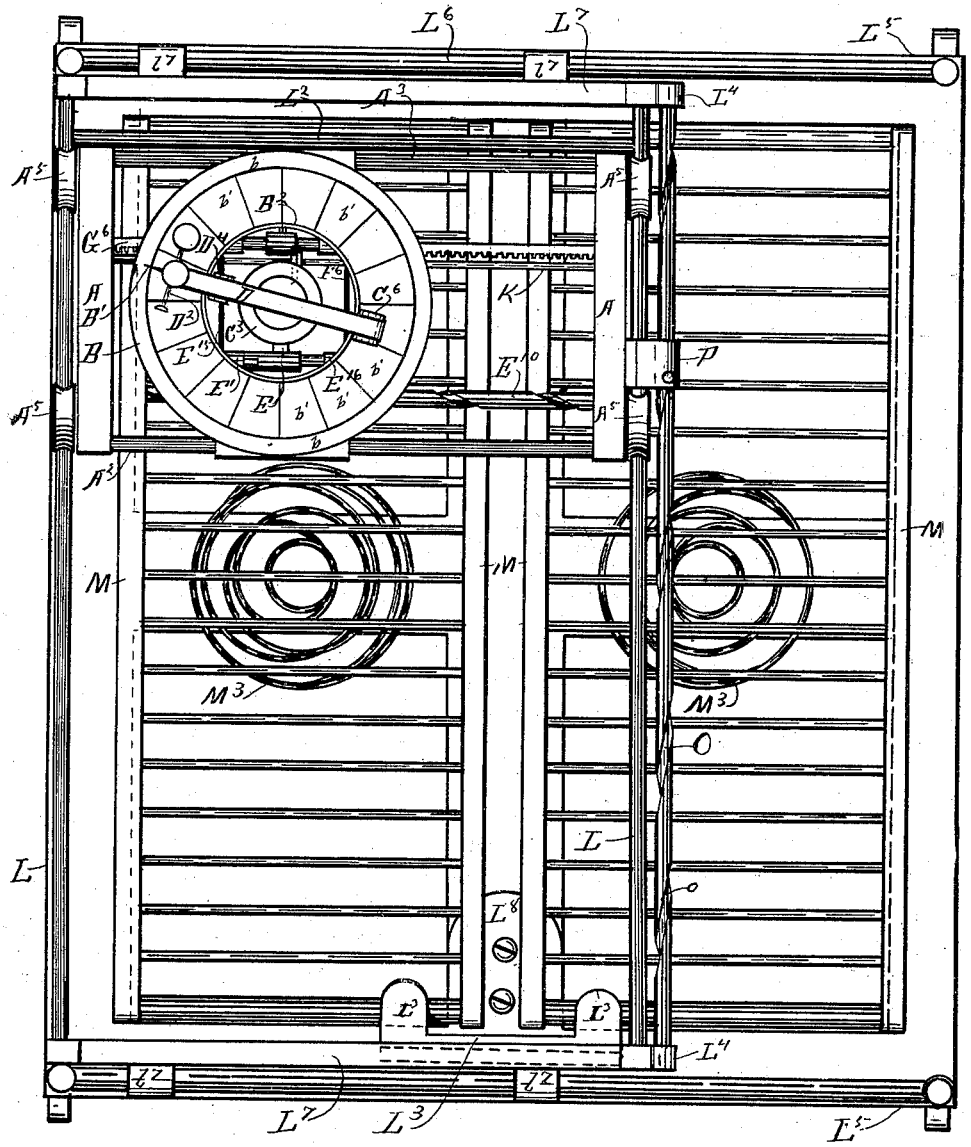
Figure 24:
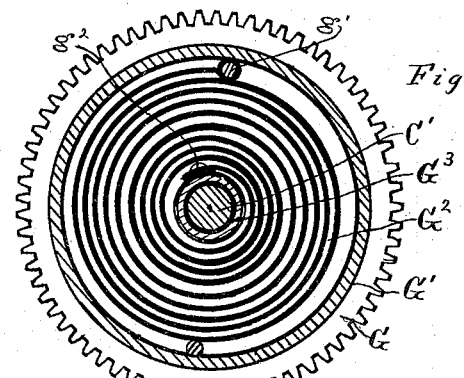
Figure 25:
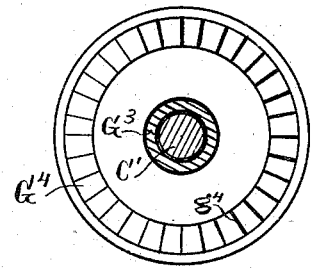
Figure 26:
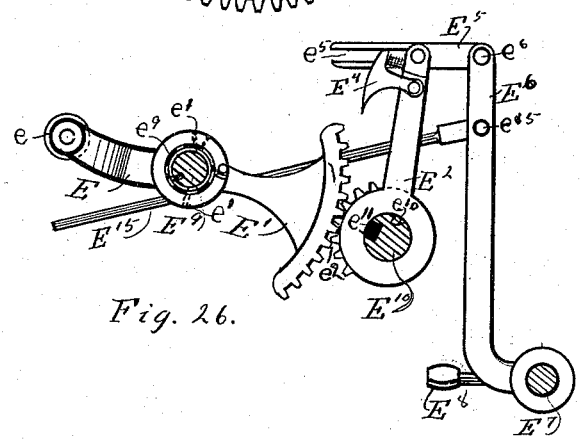
Figure 27:
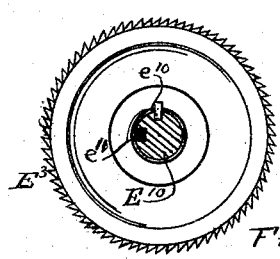
Figure 29:
Figure 30:
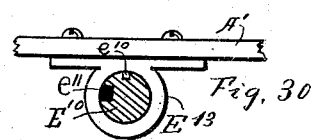
Figure 31:
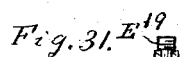
Figure 28:
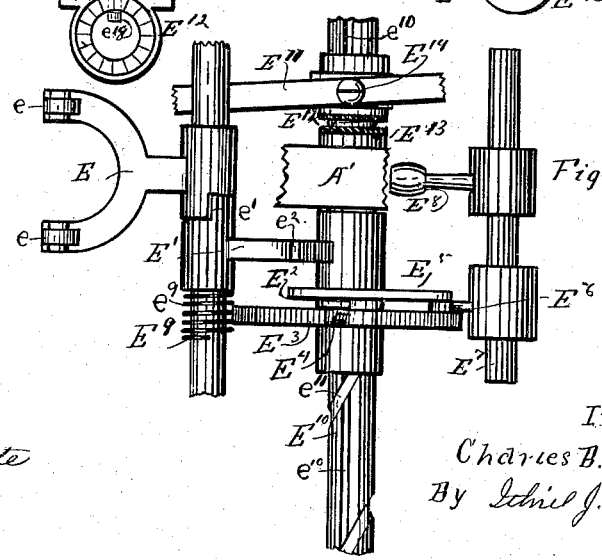

Figure 1, is a plan of the type writer upon its carriage, and having a portion of the dial cut away to show the plan of machinery, and, also, the frame cut away at Z. to show the manner of connecting the ink well arm, and the plunger barrel to throw said barrel up and down to lock and free the type cylinder; and also at W, to show the position of the main lever of the machine. Fig. 2, is a side elevation of the machine, with the supporting carriage cut off on the line $y\ y$ of Fig. 1, and the notched index gage cut away to show the lower end of the arm that supports the hand lever. Fig. 3, is a vertical cross section of the machine frame, showing the manner of constructing the cylinder shaft, the type cylinder and the type plunger. Fig. 4, is a plan of the index finger, showing the manner of attaching the pointer to the body or support. Fig. 5, is a side elevation of the end of the hand lever, and the key post in section to show the manner of operating the bell crank lever that operates the index finger. Fig. 6, is a front elevation of the machine with the hand lever, the type cylinder and the supporting frame removed. Fig. 7, is a back elevation of the same, with a portion of the cylinder and the ink well in place. Fig. 8 is a side view of the hammer hub and the fall. Fig. 9, is a top plan of the cylinder reduced in size. Fig. 10 is a bottom plan of the same. Fig. 11, is a plan, and an edge view of a portion of the collar that holds the type springs to place in the cylinder, showing an opening, and its cover, for removing the type springs. Fig. 12, is an elevation, and a plan of the ink well, its pad, and supporting shaft. Fig. 13, is an elevation of the type plunger barrel, with a grooved slide, for the reception of an antifriction roller, attached to the supporting post of the ink well. Fig. 14, is a side elevation of the book frame and of the machine, with its supporting frame or carriage cut off on the line $x\ x$ of Fig. 1. Fig. 15, is an end view of the book frame with a book in place upon its adjustable beds and a portion of the supporting frame of the machine in place to show the manner of holding the book to position. Fig. 16, is a side view of the upper end of the cylinder shaft, and of the hand lever showing a modified form of finger keys. Fig. 17, is a section of the type cylinder showing the manner of constructing the type, and also a modified form of locking device for the type cylinder. Fig. 18, is a plan of the book frame with the type writer and its supporting frame in position. Fig. 19, is a plan of the type writer frame, the carriage, and a portion of the ways that support the carriage illustrating the manner of adjusting the line spacing device. Fig. 20, is an elevation of the ratchet, pawl, and lever, that operates the line spacing shaft. Fig. 21, is the same showing its connection with the carriage frame. Fig. 22, is the pin that engages with the grooved shaft to produce the line spacing, the lower end showing an antifriction roller in section. Fig. 23, is a sectional view of a portion of the frame, and the sleeve that receives the end of the adjusting shaft. Fig. 24, is a sectional plan of the letter spacing cylinder showing the position of the actuating spring. Fig. 25, is a plan of the ratchet that sustains the strain of the actuating spring in the letter spacing cylinder. Fig. 26, is an elevation of the main, or float lever and its connections with the ratchet wheel; removed. Fig. 27, is the ratchet wheel. Fig. 28 is a plan of the main, or float lever and its connections. Fig. 29, is a side view of the lever that throws the letter spacing clutch into, and out of gear, and also one half of the clutch. Fig. 30, shows the other half of the clutch attached to a portion of the frame; and Fig. 31 is an elevation of the bolt that secures the clutch to the shaft, having at its lower end an antifriction roller in section.

Similar letters refer to similar parts throughout the several views.

The carriage frame A, is provided with a front girt $A^2$ and a back girt $A^3$ fitted to form bearings for the support and free movement of the machine frame, and also a shaft $E^{10}$, having a longitudinal groove $e^{10}$ (see Figs. 19 and 28) and a spiral groove $e^{11}$, its entire length; a rack $G^6$ and a longitudinally sliding shaft K. See also Fig. 1. This frame is provided with four wheels $A^5$ fitted to travel upon the rods or ways L of the intermediate frame.

The machine is supported in a frame A' having bearings fitted to slide freely on the rods or girts $A^2$ and $A^3$ of the supporting frame. (See Figs. 1, 2 and 19.) At the top of the frame is an index plate B, (see Figs. 1, 2 and 18) upon the surface near the outer edge of which is formed a circle or division in which may be placed a duplicate of the characters and letters in the type cylinder. The index plate is annular and at the inner edge is an upwardly projecting rim or gage $B^2$ having in its upper edge, (see Fig. 2) notches to correspond with the spaces occupied by the letters in the type cylinder. The surface of the dial plate between these lines is divided by radial lines into equal spaces $b'$ which may be finished in colors so that each certain group of letters or characters may be readily located by the color of the space adjacent to it.

The type cylinder C, (see Figs. 2 and 3) is supported below the frame A' upon a shaft C' which passes upward through the frame and is provided, at its upper end, with an enlarged, hollow end or sleeve $C^2$, having slots $c^3$ for the free passage of the pin $c^3$ in the float $C^3$. The adjustable collar or float $C^3$ is made of a proper size to fit around the sleeve $C^2$ and work up and down freely, while above it, and firmly attached to the upper end of the shaft $C^2$ is a collar $C^4$, or body that supports the arms $C^6$ and $D^4$. To the float $C^3$ is secured a short reciprocating bar $C^5$ by means of the pin $c^3$ which passes through the walls of the float and through the shaft in such a manner that the shaft and the float will work freely up and down upon the sleeve $C^2$ without affecting the position of the shaft C', sleeve $C^2$, or of the type cylinder.

At the upper end of the arm $C^6$, I pivot a hand lever D, some distance to one side of the center reciprocating bar $C^5$; and a short distance below this I pivot a lever $D^3$, having a center bearing or antifriction roller $d^3$ that comes in contact with the lower surface of the lever D, a short distance from the supporting arm $C^6$, near the center of the lever. At the end of the lever is a second roller $d^4$ which bears upon the top of the reciprocating bar $C^5$ so that any upward or downward motion of the free end of the lever D, is imparted to this bar to cause it to move up or down to raise and lower the float $C^3$. The arm $D^4$ is simply a guard passing up each side of the lever D, (Figs. 1 and 2) to prevent lost motion when the lever is being carried around to rotate the type cylinder.

The outer, or free end of the lever D is provided with a post D' which is made to turn freely in the end of the lever, and supports the finger keys by means of which the lever D is manipulated. These keys may be made of the form shown in Figs. 1, 2 and 14, in which case, a lever $D^2$ is pivoted to a projecting arm as at $d^2$ so that it may be made to move up and down in the slot $d^5$ in the post, for the purpose of operating the pin $d'$ (see Fig. 5) to press the horizontal end of the angle lever $B^3$ down to throw its lower end back for the purpose of sliding the index finger or pointer B' back or ahead. This angle lever is pivoted to the lower surface of the lever D with one end projecting out under the pin $d'$ and the other end projecting down through the slot $b^5$ in the body of the index finger—shown in Fig. 4,—the index finger being fitted to be depressed by the shoulder $b^9$—Figs. 2 to 16—on the angle lever, when the main lever is depressed, and engage with the notches in the rim $B^2$ to hold the type cylinder from turning when it is in position to print the desired character. The lower edge of the index finger B' is provided with notches $b^8$, see Fig. 16, and is attached to a support $B^4$, by screws passing through slots $b^{10}$, see Fig. 4, so that it may be readily moved longitudinally by the angle lever $B^3$ to allow the main lever to be depressed a greater or less distance, as desired, by bringing a higher or lower portion of the finger at the notches $b^8$, to rest upon the notched rim $B^2$, the object of this being to give a greater or less motion to the pawl $E^4$ and a consequent greater or less space for the characters, as hereinafter more fully described. The support $B^4$ is pivoted to the arm $D^4$ as at $b^{11}$ and is held in position by the pin $b^4$ above, and the spring $b^7$, from below. The angle lever $B^3$ is held to its normal position by a spring as $b^3$ or its equivalent.

The lever D has two motions, a rotary motion with the shaft C' by means of which the type cylinder is turned to the proper position to make the desired imprint upon the page being written, and a vertical motion with the reciprocating bar $C^5$, and the float $C^3$ by means of which its writing and spacing mechanism is operated, as follows:

I place a shaft $E^9$ upon the frame A' (see Figs. 1, 2, 6, 7, 19, 26 and 28) to one side of the vertical sleeve $C^2$, and from one side of this shaft projects an arm E having the end divided and arranged to rest under the rim of the float $C^3$, each side of its body, so that any downward motion of the float is transmitted, through the arm, to turn or roll the shaft. I also place upon this shaft an arm E' which is supported upon a hub that is left free to turn upon the shaft; a lug being formed upon this hub, and a corresponding one upon the hub that supports the arm E, leaving open spaces $e'$ $e'$ between them, so that the shaft may turn a short distance before it acts upon the arm E'. The arm E' projects from the shaft in the opposite direction from E and is provided at its outer end (Fig. 26), with a segment having gear teeth $e^2$ arranged to mesh with corresponding teeth on the hub that supports the arm $E^2$, which fits loosely upon its bearing so that any upward motion of the arm E' will cause the arm $E^2$, and with it the pawl $E^4$ to be thrown back over the teeth of the ratchet wheel $E^3$. A spring $e^9$, on the shaft $E^9$, or in any other suitable place, is arranged to throw the arm E' up when the hub thereof is allowed to revolve upon the shaft $E^9$ by reason of the arm E being thrown down with the float $C^3$.

The distance to which the arm $E^2$ can be thrown back by the spring $e^9$ is governed by the slot $e^5$ in the connecting rod $E^5$, and if it is desired to increase the length of the space, it will be necessary to exercise a sufficient amount of pressure upon the lever D, after the index finger B' has been thrown back to a lower notch $b^8$, to force the lever $E^8$ that supports the connecting rod $E^5$ back.

The lever E is drawn up to its normal position, and is made to raise the float $C^3$, and, with it, the lever D, and its attachments, by a coil spring $E^{17}$—Fig. 2,—adjustably attached at one end to the frame, by a nut $e^{17}$, and the other end attached to the end of the arm $E^{16}$, which in turn is attached, rigidly, to the shaft $E^9$. The upper end of this arm is connected, by the rod $F^6$, with the slotted lever $F^2$ by means of the head $f^6$, which is made to slide freely in the slot $f$ so that the lever $E^{16}$ may travel its entire distance with the down stroke of the lever E without affecting the lever $F^2$; which lever is rigidly attached to the shaft F to which the hammer F' is also rigidly attached by its handle and hub. To hold the hammer up to the position shown in Fig 2, I pivot a small pawl $F^3$ upon the frame, in position so that one end will engage with a notch upon the hub that secures the hammer to the shaft, and the opposite end will extend back under the rim of the float $C^3$ in position so that when the float has been pressed down to the proper distance it will throw the back end of the pawl down, and, disengaging the front end from the notch in the hammer hub, will allow the hammer to be drawn forcibly down upon the head of the type-plunger H' by the spring $F^5$.

The letter spacing mechanism consists of the shaft $E^{10}$ having a longitudinal groove $e^{10}$ for the reception of the spline connection with the ratchet wheel $E^3$ shown in Figs. 27 and 28 and a spiral groove $e^{11}$ coiled longitudinally for the reception of the antifriction roller $e^{19}$ on the end of the post $E^{19}$ in the adjustable clutch $E^{12}$—see Figs. 28, 29, 30 and 31,—which may be connected with, or disconnected from the stationary clutch $E^{13}$, at pleasure, so that when the ratchet wheel $E^3$ is turned by the pawl $E^4$ it will also turn the shaft $E^{10}$, and the lead of the groove $e^{11}$ will allow the clutch, and with it the entire machine, to move a corresponding distance longitudinal of the shaft. Thus a downward stroke of the lever D, will throw the float $C^3$ down, and with it the lever E, which revolves the shaft $E^9$, allows the lever E' to raise and throw the pawl $E^4$ back over the teeth of the ratchet wheel $E^3$, will throw the arm $E^{16}$ to the left and cause the head $f^6$ to travel back in the slot $f$ in the arm $F^2$, and will free the pawl $F^3$ and allow the hammer F to be thrown down upon the end of the type plunger H' by the spring $F^5$ with sufficient force to make the desired character upon the paper under the type cylinder.

The clutches $E^{12}$ and $E^{13}$, hereinbefore described, act as a brake to prevent the machine from traveling. The actuating power that moves the machine from space to space is a coiled spring $G^2$, which is confined in a drum G' having a gear wheel G attached—see Figs. 2, 3 and 24,—that is arranged to mesh with the rack $G^6$, the spring $G^2$ being attached at one end to a post $g'$ in the drum, and at the other end to a cylindrical standard $G^3$, fitted loosely around the shaft C' and held firmly in place in the frame, as shown in Fig. 3, and around which the drum is made to revolve freely. To hold this post, and to increase or diminish the tension of the spring, I attach a plate $G^4$ to the post $G^3$, and form in the upper surface of this plate a series of teeth $g^4$,—Fig. 25. I then attach a pawl $G^5$ (see Fig. 2), to the frame to act with said plate to hold it to any position that I may turn it, so that when the shaft $E^{10}$ is turned the spring $G^2$ will force the gear wheel G to travel in the rack $G^6$ and carry the machine with it.

My type cylinder C is made practically of the form shown in Figs. 1, 2, 3, 9 and 10, having apertures $I^{11}$ drilled or formed through it for the reception of the type I, inserted practically as shown in Fig. 3, and held up to position by springs I', one end of which enters small notches $i$ in the type, and the other end secured in a groove $i'$ near the center of the cylinder. These springs are held to place by a washer $I^2$ which is forced against them by a nut $I^3$ screwed upon the end of the shaft C', and which, in turn, is held firmly to place by a jam nut $I^4$. The washer $I^2$ should be larger than the nut, as shown in Fig. 10, and should have a narrow opening $i^2$ (shown in Fig. 11) that may be brought over any spring it may be necessary to remove, and the spring and its type removed without loosening the other springs. To prevent a spring from dropping out through this opening, I provide a cover $i^{11}$ for it, that may be securely screwed to the washer and fill the opening.

For the purpose of securing the cylinder and preventing it from turning, when in position to print the desired characters, it may be provided with a series of notches $c$, as in Figs. 2 and 7, or the type receptacle may be countersunk at the upper end, as in Fig. 17, at $c^{11}$, and the lower end of the type-plunger barrel H be fitted to engage therewith. The type plunger barrel is cylindrical in form, and is supported in a vertical position in the frame A', and is fitted for the reception and free action of the type plunger H', which is held up to its normal position by a spiral spring $h$ within the barrel, as shown in Fig. 3.

My appliance for raising and lowering the plunger barrel, to release or to secure the type cylinder, consists of an inclined cleat $H^2$—Figs. 2, 3, 7 and 13—attached to the barrel near the upper end, and in position to receive the antifriction roller $j$ at the outer end of the arm $J^4$, Fig. 12, on the ink well shaft. This cleat is grooved, so that the roller will pass through it freely when the arm is drawn around, as hereinbefore described, and will throw the barrel down—when the arm is drawn forward—just sufficiently to hold the type cylinder securely, but freely, in its proper position; and to raise it, just enough, when the arm is thrown back, to free the cylinder and allow it to be turned freely.

The ink well $J^2$ is a small cylindrical reservoir that stands just within the rim of the type cylinder, and projects upward into the cylinder back of the type as indicated in Figs. 2 and 7, and is designed to contain liquid ink for inking the type as each character is formed. This well is supported upon a base J' having an absorbent mat $j'$ of felt, or other suitable material, that receives the ink as it flows from the well, and holds it in solution until taken up by the type. This base, in turn, is supported upon a shaft J that extends upward through, and is supported by the frame A' so that it may be easily turned to throw the ink pad under, and from under the type as the printing progresses. This shaft has an arm $J^4$ projecting from the side near its upper end, in position to be connected with the arm $E^{18}$ which is firmly secured to the shaft $E^9$ through the medium of the connecting rod $J^5$, Figs. 1 and 2, so that when the shaft $E^9$ is turned by the downward stroke of the float $C^3$, the arm $J^4$ on the ink well shaft will be drawn forward and the ink pad will be drawn from under the type, and at the same time the plunger barrel H will be forced down, as hereinbefore described, before the hammer is released and descends to drive the plunger H' upon the type; and when the shaft $E^9$ is turned back to its normal position the ink pad will be thrown back under the type and the plunger barrel raised as described.

The hammer F' is drawn forcibly down upon the type plunger H' by means of a spiral spring $F^5$ attached at one end to the lever $F^2$ and at the other end to the frame A' as at $f^5$. See Fig. 2. To increase the force of the stroke of the hammer for printing from type having several characters upon their face, as "ing," "the," "not," "est," &c., I place a spiral spring $f^a$ around the shaft F, see Fig. 1, one end of which is attached to the hub that supports the hammer, and the other end to the hub $F^7$, which fits loosely upon the shaft and is provided with a downwardly projecting arm $F^4$, which, in turn, is connected by the rod $E^{15}$, Figs. 1, 2 and 26, with the vertical arm $E^6$, which is secured at its lower end to the shaft $E^7$. This shaft is provided with an arm $E^8$ that projects over the type cylinder C and travels over a series of elevations and depressions $c^6$—see Figs. 2 and 9,—so arranged that when several characters are to be printed at one stroke the arm $E^8$ will be raised sufficiently to throw the arm $E^6$ forward and draw the arm $F^4$ with it and thus increase the tension of the spring $f^a$ to a sufficient degree to add the required amount of increased force to the stroke of the hammer. If desired, the spring $F^5$ may be dispensed with and the spring $f^a$ be utilized to perform the entire labor of both by simply increasing its tensile strength.

To throw the clutch $E^{12}$ $E^{13}$ apart, and stop the machine when the end of the line is reached, I pivot a lever $E^{11}$ to the frame, as at $e^{14}$ in Fig. 19, with the forward end pivoted to the loose or adjustable half of the clutch as at $E^{14}$ in Figs. 19 and 28, and the opposite end resting upon the shaft K. See also Fig. 7. This shaft is provided at one end with a collar or stop $k$, that will stop the travel of this end of the lever and throw the clutch at the opposite end out of gear as in Fig. 19. On the shaft K, I place a second shoulder or stop $k'$ so arranged that when the lever comes in contact with the stop $k$, if I lack one or more characters of completing a word or syllable, I can, by pressing down on the opposite end of the lever, raise the back end up over the stop $k$ and complete the word. The pivot joint at $e^{14}$ is made loose so that the lever $E^{11}$,—when the front end is pressed down over the clutch $E^{12}$ as a fulcrum,—may raise or lower upon the pivot to allow the back end to be carried over the shoulder or stop $k$. At the other end of the shaft K, I place a collar $k^2$, against which the end of the lever $E^{11}$ will come when the machine is carried back, as indicated by the dotted lines in Fig. 19, and will act the double purpose, first, of throwing the clutches into contact, and, second, of throwing the shaft endwise to operate the line spacing mechanism, as hereinafter more fully explained.

The shaft K is supported in sleeves $K^2$ and $K^3$, on the frame A, in which it is fitted to slide lengthwise freely. In the sleeve $K^2$, I place a spiral spring $k^3$, in position to press endwise against the shaft, which acts the double purpose, first, of allowing the shaft to slide endwise without jar, thus cushioning the stroke of the lever $E^{11}$ against the collar or stop $K^2$, and, second, of throwing the shaft back to place after the clutches have been locked and the machine is in position to commence writing at the beginning of a line, and operate the line spacing mechanism, which consists, in addition to the shaft K, of a spirally grooved shaft O—Figs. 19, 20, 21, 22 and 23,—supported upon the intermediate frame posts $L^4$, as in Figs. 15 and 18, parallel with the tracks or ways L that support the frame A. The shaft O has a longitudinal spiral groove $o$, and a straight groove $o'$. I attach a frame or support P, to the end rail of the carriage frame A, the downwardly projecting arms of which encircle, and form easy bearings around the grooved shaft O, at each side of the ratchet wheel R, and through one of said arms I pass a stud P' having a small antifriction roller $P^2$ at its lower end, that is designed to travel in the groove $o$, and acts as a brake to prevent the carriage or frame A from traveling upon the ways L except when the ratchet wheel is turned. The ratchet wheel R is fitted to slide freely on the shaft O, and is connected thereto by a key or spline $o^2$ arranged to slide freely in the groove $o'$ in the shaft, so that the turning of the ratchet wheel will turn the shaft, and causing the stud P to follow the groove $o$, will at the same time force, or allow the frame or carriage A to move longitudinally of the shaft to a distance corresponding with the amount the ratchet wheel and shaft are turned. To turn the ratchet wheel R, I place an arm $Q^3$ upon the shaft O, between the bearings of the frame P, and adjacent to the ratchet wheel, and attach to it a pawl $r$, in position to engage with the teeth of the ratchet wheel so that when the arm is drawn back toward the machine the pawl will travel back over the points of the teeth, and when the arm is thrown forward from the machine, it will engage with the teeth and cause the ratchet to revolve with the effect above stated. This arm is provided with a slot $q^2$ having an adjustable stop $Q^4$ by means of which the distance traveled by the head $q^4$ on the connecting rod Q' may be adjusted to give a greater or less travel to the arm, as it is desired to make a wide or a narrow space between the lines of writing; and it is operated by means of the arm Q, which is pivoted at the lower end, as at $q'$, to the bottom of the side of the frame A, and is connected, at the upper end, with the arm $Q^3$, through the medium of the connecting rod Q'. It is also connected, near its longitudinal center, to the end of the shaft K in such a manner that when the shaft is drawn back against the spring $k^3$ it will draw the arm over toward the machine, see Fig. 20, and when released it will return to its normal position—as in Fig. 21,—and will turn the ratchet to form the space between the lines.

My appliance for supporting the book N, or the paper to be written upon consists of two floats or beds M, held up to place by flexible spiral springs $M^2$, and guided to place by equalizing rods M'—see Figs. 14, 15 and 18— which rods are provided with a short slot $m$ at each end,—one end of each rod being pivoted to the float, and the other end of each to the bottom of the frame; the whole being contained in, and supported by the frame $L^5$, $L^6$. The rails $L^7$ of the intermediate frame $L^4$ is provided with short bearings $l^7$ that will slide freely upon the girts or ways $L^6$ to move the machine over, from one page of a book to the other.

My appliance for holding the book down upon the beds or floats, consists of a rod or girt $L^2$ fitted to slide to any desired position upon the rods L' of the intermediate frame, for the upper end of the book, and a standard $L^9$ attached to the bottom of the frame, as at $L^8$, with diverging fingers $L^3$, arranged at the upper end to extend over the bottom of the pages. See Figs. 15 and 18. It will be readily seen that by the use of this rod, and the standard as described the two pages of a book, that are to be printed will always be held level, laterally, regardless of what portion of the book is to be printed in, while the floats M will adjust themselves to support the backs of the book to the necessary position, as shown in Fig. 15.

To prevent the type from turning in its bearings I turn off the lower edge of the cylinder and place a ring $C^8$ around it as shown in Fig. 3, and flatten the side of the type for a short distance, as at $i^4$ to allow it to move up and down freely.

My appliance for locking the vertically reciprocating bar $C^5$ and the float $C^3$ so that a character cannot be printed after the clutch $E^{12}$ has been thrown out of gear by the lever $E^{11}$, as hereinbefore described, consists of the projecting arm $E^{18}$, on said lever, which is so situated that when the clutches are in mesh the arm $E^{18}$ on the shaft $E^9$ will pass within this projecting arm and allow the shaft to turn, but when the clutches are thrown apart, the arm $E^{18}$ will come against the end of the projecting arm $e^{18}$ as indicated in Fig. 19, and prevent the shaft from turning, by reason of which the arm E is held rigidly to place and locks the float or collar $C^3$ to place so that the lever D cannot be thrown down until the lever $E^{11}$ is again thrown around so that the clutches are brought into contact, and the arm $E^{18}$ released as hereinbefore indicated.

Having thus fully described my invention, what I claim as new, and desire to secure by Letters Patent of the United States, is—

1. The combination, in a type writing machine, of a type cylinder, a vertical shaft therefor mounted to turn freely in its bearings, said shaft having its upper end enlarged, made hollow and provided with longitudinal slots through its walls, a float mounted on the hollow portion of the shaft, a reciprocating vertical bar arranged to reciprocate in the hollow portion of said shaft, a pin passing through the reciprocating bar the float and the slots in the hollow portion of the shaft, a sleeve for operating the reciprocating bar and float, a standard at the free end of the lever, an adjustable key supported on the standard, a dial plate and an endwise adjustable index finger support, and an adjustable angle lever for said finger, substantially as, and for the purpose set forth.

2. The combination, in a type writing machine, of a type cylinder, a vertical shaft therefor mounted to turn firmly in its bearings, the upper end of said shaft provided with a vertically reciprocating float, a lever for operating the float, a rocker shaft within the machine, an arm rigidly attached to the rocker shaft the outer end of which passes up against the lower side of the float, an arm and a spring to actuate said shaft to force the float arm up against the float, an arm fitted upon said shaft so that the shaft may turn without moving the arm, the hub of said arm forming a clutch with the float arm and the free end provided with a toothed segment, a spring for actuating said arm against the action of the float arm, a spirally grooved feed shaft, a spline or sliding key and groove connection between said shaft and a ratchet feed wheel said feed wheel mounted upon said shaft, an arm upon said shaft provided with a toothed segment to engage with the segment on the rocker shaft arm, a pawl or sear upon said arm in position to actuate the feed wheel, and clutches upon the grooved feed shaft, to facilitate the travel of the machine when writing a line, and returning to position, substantially as, and for the purpose set forth.

3. The combination, in a type writing machine, of a type cylinder, a vertical shaft therefor mounted to turn firmly in its bearings, a vertically reciprocating float upon the upper end of said shaft a lever and keys for manipulating said float, a rocker shaft, a lever securely attached to said shaft and projecting out to bear up against the lower surface of the float, a spirally grooved feed shaft having a straight longitudinal groove for spline connection with a ratchet wheel, a ratchet wheel and an actuating arm mounted upon said shaft, a spline connection between the ratchet wheel and the shaft, a pawl or sear at the upper end of the arm in position to engage the ratchet wheel, an actuating spring to throw the pawl or sear arm to position, and an arm and spring to actuate the rocker shaft to throw the float arm solidly against the lower surface of the float; with a hammer shaft mounted back of the cylinder shaft to turn firmly in its bearings, a slotted arm attached to and extending upward from said shaft, and a connecting rod connecting the same with the upwardly projecting arm on the rocker shaft said rod slidingly connected to the arm on the hammer shaft, a hammer attached to said shaft, a pawl or sear and a ratchet to hold the hammer to position when raised, a spring to throw the hammer solidly upon the type plunger when released from the sear, a type plunger, and an ink well pivoted to be thrown to and from under the type beneath the plunger, substantially as, and for the purpose set forth.

4. In a type writing machine, the combination of a type cylinder having apertures for the reception of the type a vertical shaft therefor mounted to turn firmly in its bearings the upper end of said shaft provided with a vertically reciprocating float and plunger, a lever pivoted to one side of, and lying directly over said plunger and provided at its free end with a standard supporting a key for manipulating the plunger, a rocker shaft, an arm extending from the rocker shaft to and under the float an arm and a spring for holding said shaft to position to raise the float and its connections, an arm loosely fitted to said shaft, the hub of which is connected to the hub of the float arm by a clutch and the free end provided with a toothed segment, a spring for raising said arm, a spirally grooved feed shaft having a spline connection with a ratchet wheel, a ratchet wheel slidingly mounted on said grooved shaft, an arm upon said shaft having teeth upon its hub to mesh with the arm E' and its upper end provided with a pawl or sear to actuate the ratchet wheel, and a clutch upon the feed shaft, a shaft for supporting the hammer a slotted arm upon said shaft connected with and operated by an arm upon the rocker shaft, a hammer mounted upon said shaft, a pawl or sear and a spring for actuating said shaft an adjusting arm loosely mounted upon said shaft and connected with one end of said spring the end of said arm connected with the vertical arm E² which latter is mounted upon a shaft, an arm secured to the shaft and standing at right angles with the arm E², projecting over the type cylinder, and a series of elevations and depressions on the surface of the type cylinder to actuate the arms, substantially as, and for the purpose set forth.

5. In a type writing machine, the combination of a type cylinder, a vertical shaft therefor mounted to turn firmly in its bearings the upper end of said shaft provided with a float and plunger fitted to reciprocate vertically, a lever, a standard and keys for manipulating the same, an index plate, an endwise adjustable finger, an angle lever and a slide for adjusting said finger, a rocker shaft, an arm passing said shaft to and under the float an adjustable arm upon said rocker shaft and connecting the same with the letter spacing mechanism, an arm and a spring for actuating said shaft against the float, a spirally grooved feed shaft, a ratchet wheel and a pawl or sear for actuating said shaft, a clutch, a lever for actuating said clutch, a rod, a spring to throw said rod end-wise in one direction, adjustable collars upon said rod arranged to trip the spacing lever and throw the clutch upon the spirally grooved feed shaft into and out of contact, a feed drum, a coiled spring in said drum, a cylindrical post for supporting the tension of said spring, a pawl or sear, and a ratchet for holding said post to position, gear teeth upon said drum, and a toothed bar to engage therewith to actuate the machine, a shaft for supporting the hammer, a slotted arm projecting up from said shaft and connected with the arm upon the rocker shaft on the opposite side of the machine, a hammer, a pawl or sear, and a spring for actuating the hammer, a type plunger immediately under said hammer, and a cylinder for supporting said plunger, the lower end of said plunger fitted to form a lock with the surface of the type cylinder and the upper end having an inclined slide upon one side, a spring within the cylinder to throw said plunger up, an ink well supported upon a vertical shaft, an arm upon said shaft to engage with the slide on the type-plunger cylinder, a rod connecting said arm with an arm on the main rocker shaft, and a supporting frame, substantially as and for the purpose set forth.

6. In a type writing machine for books, the combination of a type cylinder, a circular row of type near its periphery, a supporting frame above said cylinder, a shaft for supporting said cylinder, said shaft supported to turn firmly in bearings in said frame the upper end of said shaft arranged to oscillate vertically, levers and keys for manipulating said upper end, a rocker shaft, arms and springs for operating said rocker shaft, a spirally grooved feed shaft, a pawl or sear, a ratchet wheel and clutches for actuating said feed shaft, a cylinder, a spring within said cylinder, a rack, gear teeth around said cylinder to actuate the letter spacing mechanism a type hammer, a rocker shaft for supporting the same, a slotted arm upon said shaft and connected with an arm on the rocker shaft, and an actuating spring connected at one end to the shaft, and at the other end to an adjusting arm, a connecting rod between said arm and the arm $E^6$ on the opposite side of the machine, a type plunger, a cylinder, and an actuating spring for raising said plunger, and an ink well supported upon a base, an absorbent ink distributer upon said base the ink well supported by a vertical shaft that turns freely in its bearings and is connected by a lever and rod with the rocker shaft to throw the ink distributer to and from under the type, the end of said lever arranged to engage with the incline on the type plunger cylinder to throw it down endwise; with a carriage, a frame and ways for supporting the carriage a spirally grooved feed shaft upon said frame said shaft connected with the carriage by sliding bearings, a ratchet wheel upon said shaft connected to turn the shaft and to slide upon it by a spline connection a pawl or sear and a lever to actuate said ratchet wheel to turn the shaft, and a rod in the carriage frame actuated longitudinally in one direction by the return motion of the machine and in the opposite direction by a spring to actuate the ratchet lever and pawl, substantially as, and for the purpose set forth.

7. The combination in a type writing machine of a horizontal type cylinder, a vertical shaft for supporting the cylinder, a vertically reciprocating float at the upper end of said shaft, a lever, an auxiliary lever, a standard and keys for operating said float a circular line of type passing through the type cylinder near its periphery, a plunger in the frame for forcing said type down upon the page of the book, and springs in the cylinder for forcing them up, an ink well below the type cylinder and upon a base having an ink distributer in conjunction with the ink well and supported upon a shaft so that it may be thrown to and from under the type, a rocker shaft, a spirally grooved feed shaft in the machine, springs, sears, ratchets, clutches and arms for actuating the shafts, a hammer, a hammer shaft having arms, springs, sears and connecting rods connected with the main rocker shaft to actuate said hammer shaft, a drum, a coiled spring within said drum, and gear teeth upon its periphery, and a rack in the carriage in position to engage with said gear teeth to actuate the machine for letter spacing, a carriage frame, ways in said frame for supporting the machine, a supporting frame, ways or tracks in the supporting frame for supporting the carriage, a spirally grooved feed shaft, a ratchet wheel connected therewith by a spline and groove connection to run said shaft and at the same time to travel lengthwise thereof to carry the carriage down the page of the book, and mechanism for actuating said ratchet wheel; of a book frame having adjustable floats for supporting the books, springs to support said floats, equalizers to hold them to position, and ways for the free movement of the intermediate supporting frame or carriage ways from one page of a book to another, substantially as and for the purpose set forth.

8. The combination, in a type writing machine, for books, of a horizontal type cylinder, a vertical shaft for supporting said cylinder, and a vertically oscillating extension at the upper end of said shaft; with a main lever pivoted at one end to an arm extending out from the cylinder shaft, an auxiliary lever pivoted to said arm below the main lever, antifriction rollers on said auxiliary lever so situated that one will rest against and support the main lever and the other will rest upon the top of the adjustable extension of the cylinder shaft, a hollow vertical standard at the free end of the main lever, a sliding bolt passing through said standard, keys arranged to manipulate said bolt vertically, an angle lever pivoted to the lower surface of the free end of the main lever, one arm of which extends out under the bolt and the other arm extends down through a slot in the index finger and is provided with a shoulder, a spring for holding the angle lever to position, a longitudinally adjustable index finger attached to a body, in position to be thrown endwise by the angle lever, and notched upon its lower surface to engage with the serrated rim $B^2$ to govern the length of the spaces between letters, said body pivoted to the arm that supports the main lever, and a serrated rim for locking the index finger to position when the character is being formed, with a rocking shaft, a spirally grooved feed shaft, arms, springs, ratchets, sears and clutches for operating said shafts, a hammer, a hammer shaft, arms, springs and connecting rods for operating said hammers, a type plunger, type, an adjustable ink well, feed mechanism and spring, substantially as, and for the purpose set forth.

9. The combination, in a type writing machine for books, of a horizontal type cylinder, a vertical shaft for supporting said cylinder, the upper end of the shaft provided with a plunger and a float that may be made to oscillate vertically, a lever and keys for operating said plunger, a rocker shaft having an arm connected with and actuated by said plunger and float, an arm and a spring for operating said arm against said float, a feed shaft, a ratchet wheel, springs and clutch for operating said feed shaft, a type hammer, type plunger, type, an adjustable ink well and a carriage frame having an endwise adjustable rod; with a locking device consisting of an arm on the rocker shaft and an arm upon the clutch lever so arranged that the arm on the rocker shaft may be made to engage with the arm on the clutch lever and lock the machine so that the type hammer cannot be operated, or to pass between this arm and the lever and operate the several parts of the machine, and a clutch lever, substantially as, and for the purpose set forth.

Signed at Grand Rapids, Michigan, this 16th day of February, 1894.

CHARLES B. WHITAKER.

In presence of—
ITHIEL J. CILLEY,
JOHN C. BUCHANAN.